United States Patent
Kraft et al.

(10) Patent No.: US 7,865,407 B2
(45) Date of Patent: *Jan. 4, 2011

(54) SYSTEM AND METHOD FOR AUTOMATING ASSOCIATION OF RETAIL ITEMS TO SUPPORT SHOPPING PROPOSALS

(75) Inventors: Reiner Kraft, Gilroy, CA (US); Joerg Meyer, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/953,232

(22) Filed: Dec. 10, 2007

(65) Prior Publication Data

US 2008/0091572 A1  Apr. 17, 2008

Related U.S. Application Data

(63) Continuation of application No. 09/783,410, filed on Feb. 14, 2001, now Pat. No. 7,346,559.

(51) Int. Cl.
G06F 17/30 (2006.01)

(52) U.S. Cl. .............................. 705/27; 705/26; 705/37; 707/1; 707/3; 707/104

(58) Field of Classification Search .................. 705/26, 705/27, 37; 707/1, 3, 104; 706/47
See application file for complete search history.

(56) References Cited

U.S. PATENT DOCUMENTS

| | | | |
|---|---|---|---|
| 5,675,784 A | 10/1997 | Maxwell et al. | |
| 5,710,887 A | 1/1998 | Chelliah et al. | |
| 5,890,175 A | 3/1999 | Wong et al. | |
| 6,029,141 A | 2/2000 | Bezos et al. | |
| 6,032,145 A | 2/2000 | Beall et al. | |
| 6,070,149 A | 5/2000 | Tavor et al. | |
| 6,240,397 B1 | 5/2001 | Sachs | |
| 6,266,649 B1 | 7/2001 | Linden et al. | |
| 6,366,910 B1 | 4/2002 | Rajaraman et al. | |

(Continued)

OTHER PUBLICATIONS

BroadVision One-to-One Knowledge, Product Overview, copyrighted 1999.

(Continued)

*Primary Examiner*—Robert M. Pond
(74) *Attorney, Agent, or Firm*—Cantor Colburn LLP; Brian Lambert (57) ABSTRACT

A shopping server proposal system includes a mechanism that enhances the online retailer's existing database system with the necessary information to provide the desired services. The existing catalog of items is analyzed based on a set of predefined rules for a given retail store. This analysis determines which of the items in the catalog are related to other items in the catalog. The result of this analysis includes new relations of the catalog items that are written into the retailer's existing database system. The mechanism for assembling this information, based on a set of predefined rules, is independent of the retailer or the retailer's industry. The provides retail businesses with a competitive edge by enabling them to offer automated shopping advice to solve the shoppers' problems of finding related and matching items, and by providing a list of related items based on the selected item's properties.

12 Claims, 6 Drawing Sheets

U.S. PATENT DOCUMENTS

| | | |
|---|---|---|
| 6,484,149 B1 | 11/2002 | Jammes et al. |
| 2001/0021914 A1 | 9/2001 | Jacobi et al. |
| 2002/0010625 A1 | 1/2002 | Smith et al. |
| 2002/0010637 A1 | 1/2002 | Lieu et al. |
| 2003/0050916 A1 | 3/2003 | Ortega et al. |

OTHER PUBLICATIONS

Blaze Software, "Ruling a Self-Service World," Blaze Advisor White Paper, Updated for Version 2.5, copyrighted 1998.

Blaze Software, "Architechting for Change," The Rule Engine Proposition, A brief for the CEOs and senior managers of software companies, copyrighted 1999.

Blaze Software, "ruling a Self-Service World," Technical White Paper, Updated for Version 2.5, copyrighted 1999.

Web page: http://www.atg.com/products/dps/dps_main.html?didframe=tn, printed Feb. 9, 2001.

Web page: http://www.atg.com/products/dps/pcc.html?didframe=tru, printed Feb. 9, 2001.

Web page: http://www.atg.com/products/dps/targeted_email.html?didframe=trn, printed Feb. 9, 2001.

Web page: http://www.atg.com/products/dps/oca.html?didframe=tru, printed Feb. 9, 2001.

Web page: http://www.annuncio.com/products/brightcapabilities.html, printed Feb. 9, 2001.

SYSTEM AND METHOD FOR AUTOMATING ASSOCIATION OF RETAIL ITEMS TO SUPPORT SHOPPING PROPOSALS

CROSS REFERENCE TO RELATED APPLICATIONS

This application is a continuation of U.S. patent application Ser. No. 09/783,410 filed Feb. 14, 2001, the contents of which are incorporated by reference herein in their entirety.

FIELD OF THE INVENTION

The present invention relates to the field of electronic commerce (e-commerce), and it particularly relates to consumer-to-business transactions. More specifically, in the context of this invention, a business can be a retail store or a group of merchants whose retail items can be combined based on attributes such as colors, sizes, and style in fashion stores. The present invention is equally applicable to other stores that market, for example, hardware, tools, electronics, and other items.

BACKGROUND OF THE INVENTION

The World Wide Web (WWW) is comprised of an expansive network of interconnected computers upon which businesses, governments, groups, and individuals throughout the world maintain inter-linked computer files known as web pages. Shoppers navigate these pages by means of computer software programs commonly known as Internet browsers. Due to the vast number of WWW sites, many web pages have a redundancy of information or share a strong likeness in either function or title. The vastness of the unstructured WWW causes shoppers to rely primarily on Internet search engines to retrieve information or to locate businesses. These search engines use various means to determine the relevance of a shopper-defined search to the information retrieved.

The authors of web pages provide information known as metadata within the body of the hypertext markup language (HTML) document that defines the web pages. A computer software product known as a web crawler systematically accesses web pages by sequentially following hypertext links from page to page. The crawler indexes the pages for use by the search engines from information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the shopper-defined search rather than attempt to find matches in real time.

A typical search engine has an interface with a search window where the shopper enters an alphanumeric search expression or keywords. The search engine sifts through available web sites for the shopper's search terms, and returns the search of results in the form of HTML pages. Each search result includes a list of individual entries that have been identified by the search engine as satisfying the shopper's search expression. Each entry or "hit" may include a hyperlink that points to a Uniform Resource Locator (URL) location or web page.

Electronic shopping (or e-shopping) has been gaining popularity as the popularity of the World Wide Web increases. E-shopping continues to evolve from a means of providing an easy way of accessing (and publishing) information on the Internet to a virtual marketplace where almost every merchandise can be traded, as it is in the physical world. As more retail businesses market their merchandise over the WWW, it will become more important for a business to distinguish itself from the competition. One of the significant deficiencies of online retail stores is the amount of shopping advice they can offer. Typically, the shopper does not have access to a sales clerk to accompany him or her in finding the items of choice, or related and matching items.

For example, if the shopper is browsing in a regular real-world clothing store he or she can ask a sales clerk for assistance in finding items. The sales clerk can make recommendations of items that may match or enhance the chosen items. This type of advice is often missing in online shopping stores. Certain online stores try to compensate for this deficiency by offering online chat rooms as an additional service. However, online chat rooms require staffing thus added operational expense. There is therefore a need to automate the online service advice.

In addition, merchants may wish to perform "cross-selling" of goods and services, that is selling related and associated items in addition to the actual sale. In real-world shopping stores sales clerks are able to assist the shoppers by providing useful advice, which might result in additional sales. For instance, a sales clerk may recommend a shirt, and a tie, which match the selected trouser. Rather than selling only the trouser, the sales clerk will sell related additional items and increase the merchant's sales. As pointed out earlier, an Internet-based shopping site does not typically have the possibility of enhancing sales by utilizing cross-selling.

The following are exemplary attempts to provide personalized services in the field of the present invention. For a more detailed description of the services, reference is made to the corresponding web sites.

Broadvision provides solutions in the area of personalization, marketing and promotional tools for web sites. This company's web site enables companies to cross-sell items, that is, selling similar or related versions, or up-sell items, that is, newer versions, to shoppers based on previous purchases in their shopping basket, and communities of which they are members. The main focus and emphasis of Broadvision is an end-to-end application for rapid deployment and dynamic personalization of high transaction volume retail e-commerce sites. However, Broadvision does not use a rule-based approach to automatically generate linkage between different articles.

Dynamo Personalization Server is a rule-driven personalization platform based on the Dynamo Application Server. Dynamo Personalization Server allows targeting specific content to a particular user or group of users based on business rules created by business managers. It combines explicit user data from existing marketing databases with implicit information gathered on user behavior, and other related sources of information. According to the specifications of this product, it does not allow cross-selling based on rules regarding the items and does not offer enabling technology to enhance a database system to provide retail item associations.

The Rules-Based Merchandising engine of the Annuncio Bright product allows marketers to create a new program (for sales, marketing) based on their expertise. According to the product data sheet, the merchandising engine offers the following services: It enables marketers to apply their merchandising expertise to create successful programs. It further features a guided rules builder and supports many criteria, such as shopper profile, product, catalog, services, content. It also encourages mixing of criteria to create dynamic offers.

Though the merchandising engine of the Annuncio Bright product handles the creation of the rules, the result of the rule creation is not an association of items but a set of rules that define how items are related. Furthermore, this product provides and handles rules on the level of items and item categories, but not item attributes, with the items being still associated manually. It would be desirable to have a system and method that apply such a ruleset to an existing database.

The Blaze Advisor product focuses on the creation of "business rules" that are the basis of an application. It allows the creation of rules down to the level of item attributes. As with the rules-based merchandising engine of the Annuncio Bright product, which was discussed earlier, the result of the Blaze Advisor rule creation does not automatically enhance a database. Furthermore, since the rules created by the Blaze Advisor product are used during runtime, they are not independent of the underlying database system. As used herein, "runtime" means the rules are applied while the program is executed. The alternative would be to precompute the result of applying the ruleset and then access its results during runtime. There is therefore still a need for a method that performs a pre-computation to write association information into a database such that the related items can be easily found and accessed during runtime.

SUMMARY OF THE INVENTION

It is one feature of the present invention to enable online retail businesses to offer automated online shopping advice based on the shopper's current browse or for-purchase selection. An online shopping site (or server) can male suggestions of the best match items for the shoppers' current browse or for-purchase selections, potentially eliminating the need for personalized customer service, online chat advice, or store assistants. To this end, the system and method of the present invention automatically produce web pages or content that enhance the potential sale of selected items by associating other products that are linked via a pre-determined rule set, thus enhancing the shoppers' purchasing experience.

It is another feature of the present invention to enable online retail businesses to offer online shopping advice based on the shoppers' current browse or for-purchase selections. The online shopping site or server can suggest items that appropriately match or enhance the shoppers' current browse or for-purchase selection. To this end, the present system and method focus on the automated association of items. As used herein an item can be described or characterized by a set of attributes. An existing rule set describes how items can be combined. The automated association enables retailer shopping web sites to offer shopping proposals based on these associations. The present invention describes how the retailers' database system can be enhanced and modified to support the shopping proposal application, independent of the retailer, the retailer's industry or the retailer's database system.

The foregoing and other features and advantages of the present invention are realized by a shopping server proposal system and method that are generally comprised of a mechanism that enhances the online retailer's existing database system with the necessary information to provide the desired services. The existing catalog of items is analyzed based on a set of predefined rules for a given retail store (e.g. furniture, clothing, electronics, etc.). This analysis determines which of the items in the catalog are related to other items in the catalog. For example, one of the rules may define that any outdoor clothing item for men that is not underwear, can be combined with any other outdoor clothing item for men if the colors of the items match. The result of this analysis is a new set of relations of catalog items including a set of properties (e.g., color, size, category, etc.). These relations are written into the retailer's existing database system. The mechanism for assembling this information, based on a set of predefined rules, is independent of the retailer or the retailer's industry (e.g., furniture, clothing, electronics, etc.) by using intermediate formats. However, retailer specific customizations may be necessary.

The system utilizes additional information available during a shopper's shopping experience, i.e., when the shopper browses the online store and views a selection, to enable the online retailer to provide additional information to the shopper based on the user's browsing history or previous known online events of the same user. For example, if the shopper selects a shirt from the retailer's list of items, the retailer's server may return a web page containing information about the selected item. On a conventional web page rendering, the page only contains links to the retailer's catalog. However, according to the present invention, the page can contain information about related items, such as a matching pair of trousers, socks, etc. This additional information can be presented in a variety of ways. For example, this information can be incorporated into the Web page with the focus on the original selected item, or additional windows or animation can be used, to enhance the presentation of the additional information.

The present system and method provide the retail businesses with a competitive edge by enabling them to offer automated shopping advice to solve the users' problems of finding related and matching items, and by providing a list of related items based on the selected item's properties (e.g., color, size, etc.). The system and method are expected to increase sales as shoppers are provided with additional opportunities to select and buy items.

Buyers are more likely to return to a site if they enjoy the shopping experience. Using the present system, shoppers are made aware of items they may not encounter in conventional online stores, by manually browsing and searching the inventory. Customer satisfaction is very likely to increase which will have a positive effect on the online traffic.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE PREFERRED EMBODIMENTS

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

Dictionary: A database of context-related terms.

E-business, e-shopping, or e-commerce transactions: Business transactions conducted online using the Internet or another communications network.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Retailer or merchant: Includes for example, a merchant, retailer, wholesaler, distributor, or any appropriate person in the chain of commerce.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW, Web): An Internet client-server hypertext distributed information retrieval system.

Figure 1:
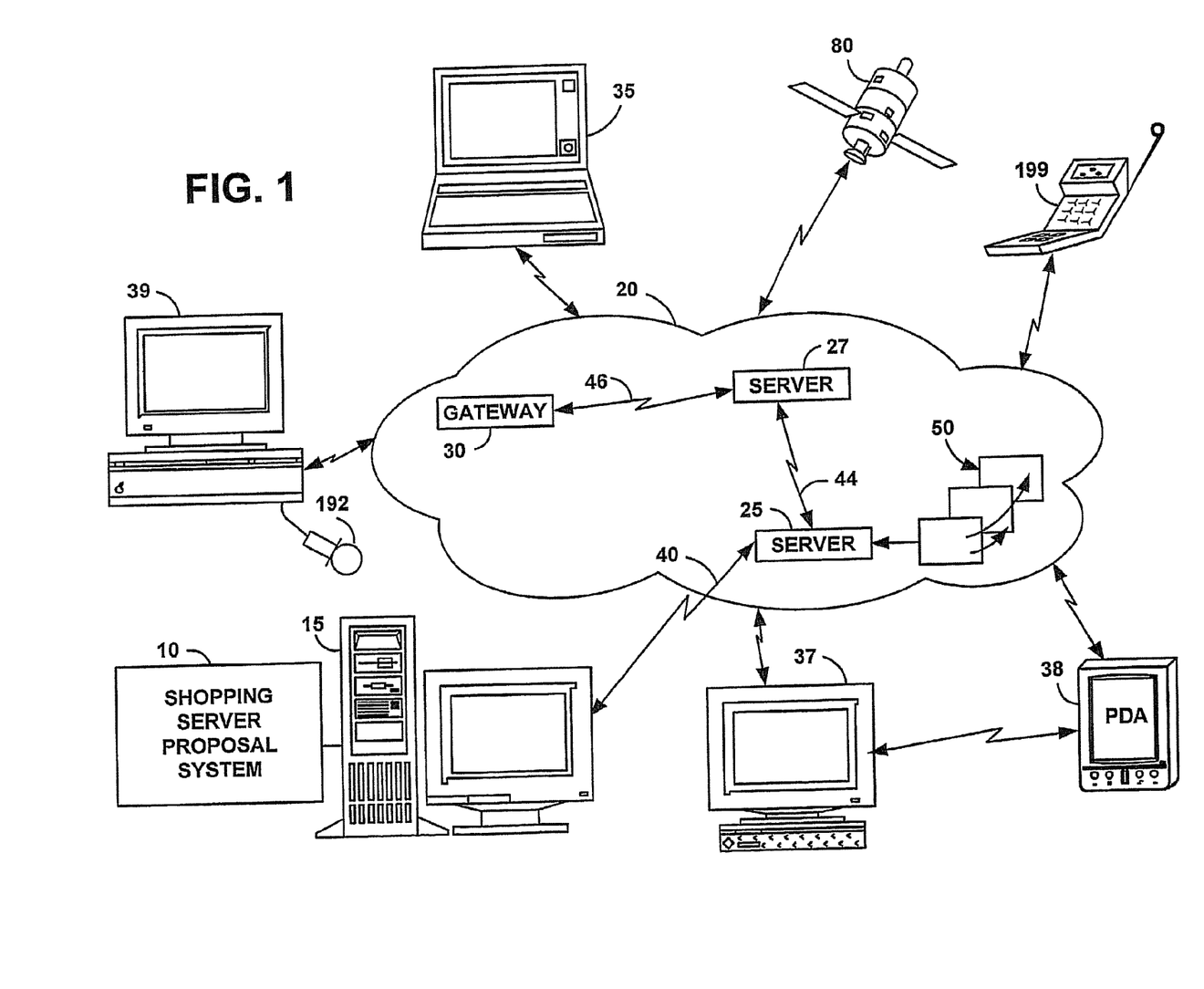
FIG. 1 is a high level block diagram of an exemplary overall environment in which a shopping server proposal system of the present invention may be used.

FIG. 1 portrays an exemplary overall environment in which a shopping server proposal system 10 of the present invention may be used. The system 10 includes a software or computer program product which is typically embedded within, or installed on, a host server 15. The system 10 may include several host servers 15 that are dispersed geographically to co-ordinate the reduction of access time from online shoppers, customers, or users 35, 37, 39. Host servers 15 may be owned and maintained by the online retail outlets or they may alternatively be contracted by the online retail outlets to third party service providers.

The cloud-like communication network 20, which is represented as a cloud to indicate an indeterminate number of connections, is comprised of communication lines and switches connecting servers 25 and 27 to gateways 30. The servers 25, 27 and the gateway 30 provide the communication access to the WWW. Shoppers located at remote Internet sites, are represented by a variety of computers such as 35, 37 and 39, and can query the host server 15 for the desired information.

The host server 15 is connected to the network 20 via a communications link such as a telephone, cable, or satellite link. The servers 25 and 27 can be connected via high-speed Internet network lines or links 44 and 46 to other computers and gateways. The servers 25 and 27 provide access to stored information such as hypertext or web documents indicated generally at 50. The hypertext documents 50 most likely include embedded hypertext links to other locally stored pages and may also contain information such as location of stores, retail outlets, malls, etc.

In addition, while the system 10 is described in connection with the WWW, it can also be used with a stand-alone database of computers 35, servers 25, gateways 30, and mobile computing devices 38 for applications that do not require interaction with the WWW. The mobile computing unit 38 can be a handheld set designed for the application of this invention or it could be a personal digital assistant (PDA) with a downloaded software application suited to implementing the method of the present invention. A mobile phone 199 can also be used as a mobile computing unit for the purposes of this invention. The increasing trend to combine a personal digital assistant 38 and cell phone 199 facilitates the convenience of using satellite communications to interact with the user. A satellite 80 be used to establish communication between the shoppers 35, 37, 39, servers 25, gateways 30, and the system 10.

Figure 2:
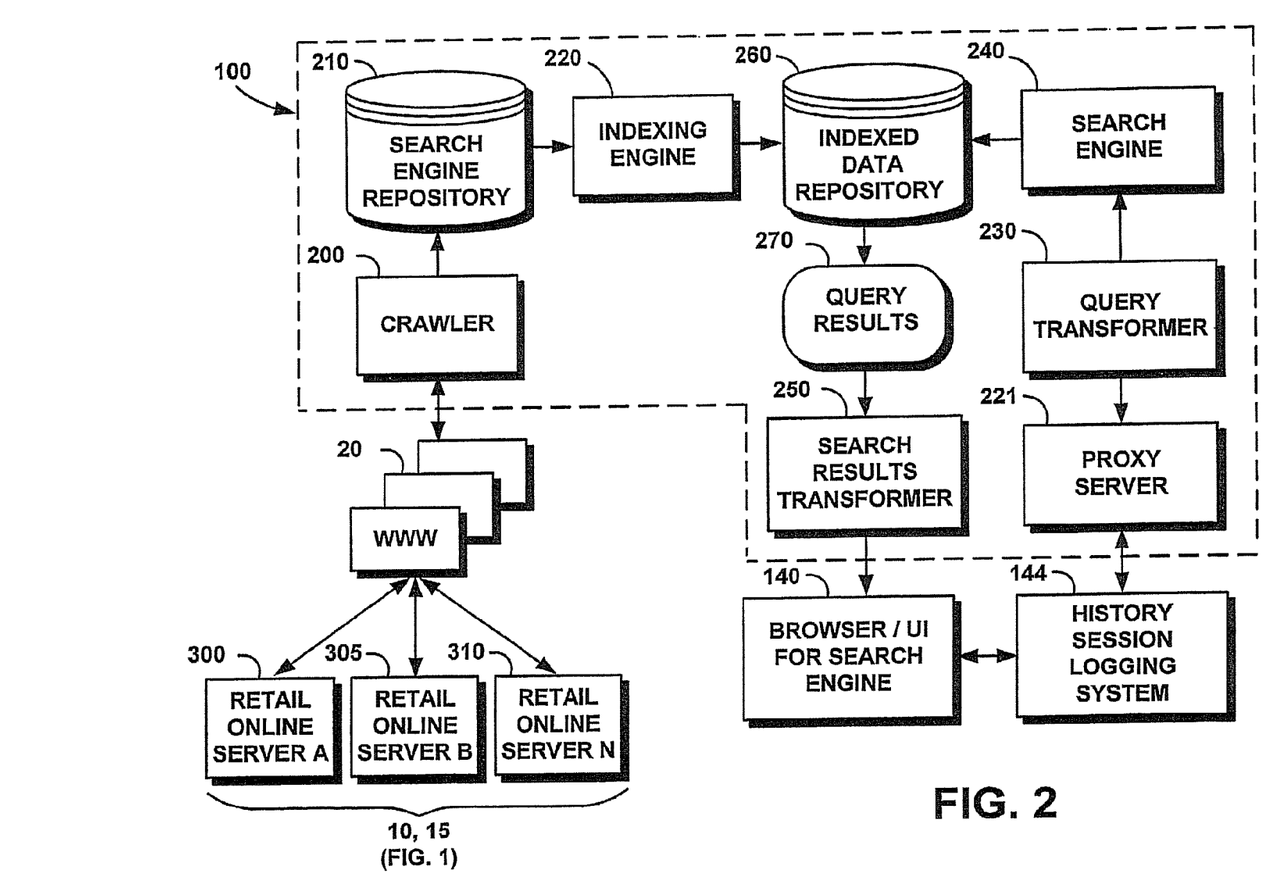
FIG. 2 is a block diagram depicting the shopping server proposal system of FIG. 1 in relation to an Internet service provider, a graphical user interface, and the World Wide Web.

FIG. 2 illustrates the system 10 of FIG. 1 in relation to an Internet service provider 100, a shopper indicated by a browser or graphical user interface (GUI) 140, and the WWW 20. A history session logging system 144 records all the actions performed by the shopper while shopping at one or more retail online servers, i.e., 300, 305, 310.

A proxy server 221 can optionally be used in conjunction with the system 10 and the history session logging system 144 as an interface between the service provider 100 and the system 10. In this illustration, the proxy server 221 is shown implemented by the service provider 100 in order to protect the shoppers' private information from unauthorized hacking. It should however be understood that from a technical aspect, the proxy server 221 and the system 10 can be integrated into a single application or software program, and can reside, for example, either on the server of the service provider 100 or on an independent server 15.

As shown, the server 15 is not limited to a single retail online server 300, but can service a multitude of other servers, i.e., 305, 310. The server 15 can be part of the retail online servers 300, 305, 310, part of service provider 100, or part of an independent service.

Searches on the WWW 20 are performed by the search service provider 100 that generally comprises a web crawler 200, a search engine repository 210, an indexing engine 220, a query transformer 230, a search engine 240, a search results transformer 250, and an indexed data repository 260. In use, the crawler 200 crawls the www 20 and downloads web documents to the search engine repository 210 where they are stored and updated systematically. The abstract/indexing engine 220 indexes the web documents and generates abstracts for the documents. The abstracts and the indexed data are stored in the abstracts/indexed data repository 260 for later use by the search engine 240, as appropriate.

The search engine repository 210 is a data store maintained by a web information gatherer such as the web crawler 200. The search engine repository 210 maintains information or metadata from previously encountered web pages. This metadata is used by the indexing engine 220 to prepare the index. Preferably, the search engine repository 210 is maintained centrally by the search service provider 100. Alternatively, the search engine repository 210 may be located and maintained on an independently provided system to which the search service provider 100 has access. The indexing engine 220 generates a description for each web document from the metadata stored in the search engine repository 210. The query transformer 230, prompted by the browser 140, applies an internal query request to the indexed data stored in the indexed data repository 260, and generates a search result with matches (or query results) 270 that are specific to the user's query.

In one embodiment, the system 10 and/or the history session logging system 144 record the shopper's actions during a visit to a current retail online server, i.e., 300, and optionally the shopper's actions during visits to other sites prior to browsing the server 300. The shopper's actions include for example, the queries made by the shopper, the URLs visited by the shopper, the products and/or services purchased by the shopper, the quotes requested by the shopper, the prices provided to the shopper, individual session profiles, etc. In addition, the shopper can manually enter additional information about himself or herself, such as hobbies, resume information, etc.

The bulk of this information is generally referred to herein as "shopper profile," and can be saved on the shopper's computer, i.e., 35, for privacy reason, or, if authorized by the shopper, it can be saved on a secure site such as a dedicated repository provided by the service provider 100, or on an independently maintained server. The information forming the shopper profile is indexed by an indexing engine for ease of access. The shopper profile can be saved for either a short time, such as the duration of the session to the current server 300, or for an extended period of time for use in future sessions.

Figure 3:
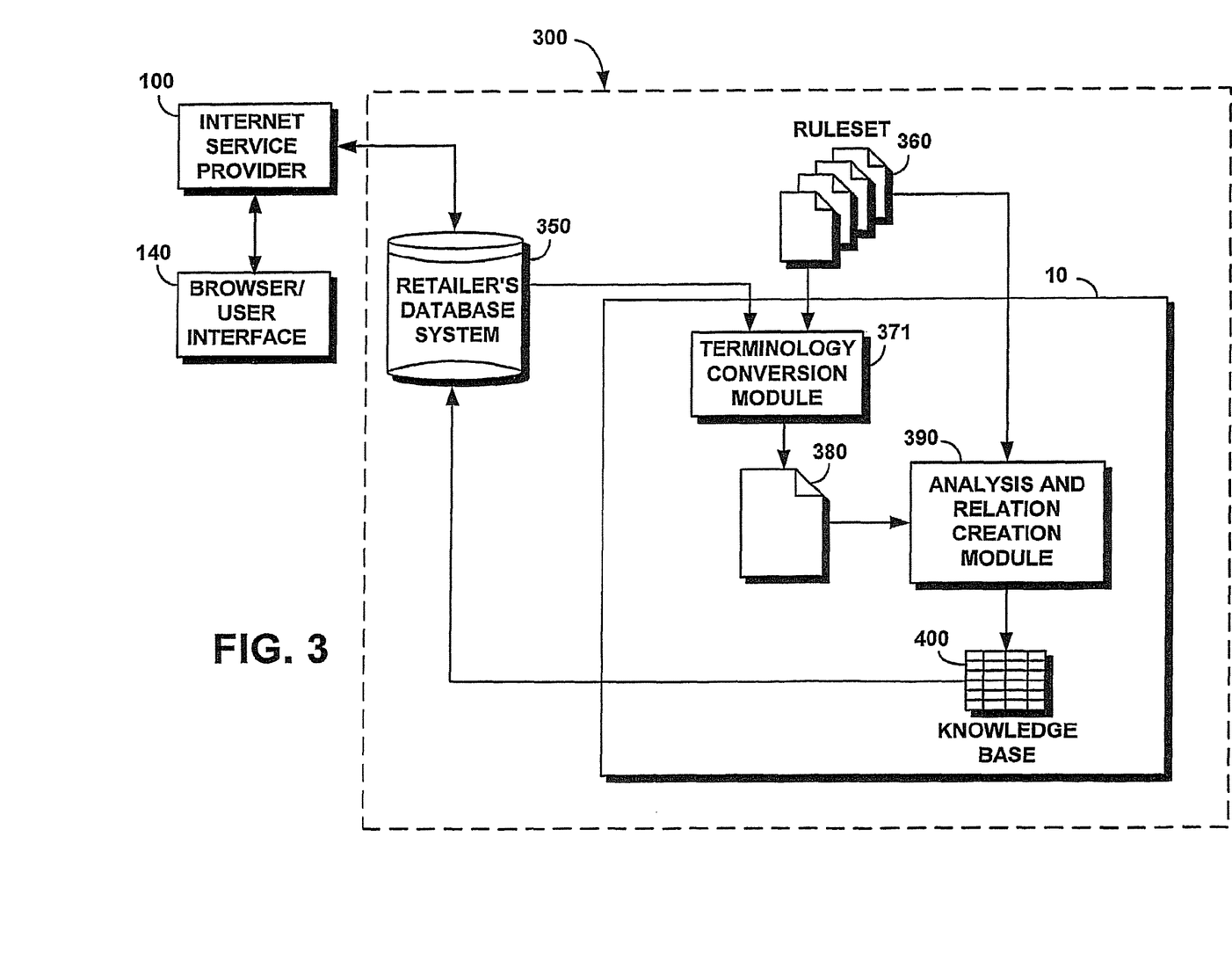
FIG. 3 is a block diagram provides a more detailed illustration of a retail online server shown using shopping server proposal system of FIG. 1 for the creation of a shopping advisor knowledge base from an existing retailer's database and an existing ruleset.
Figure 5:
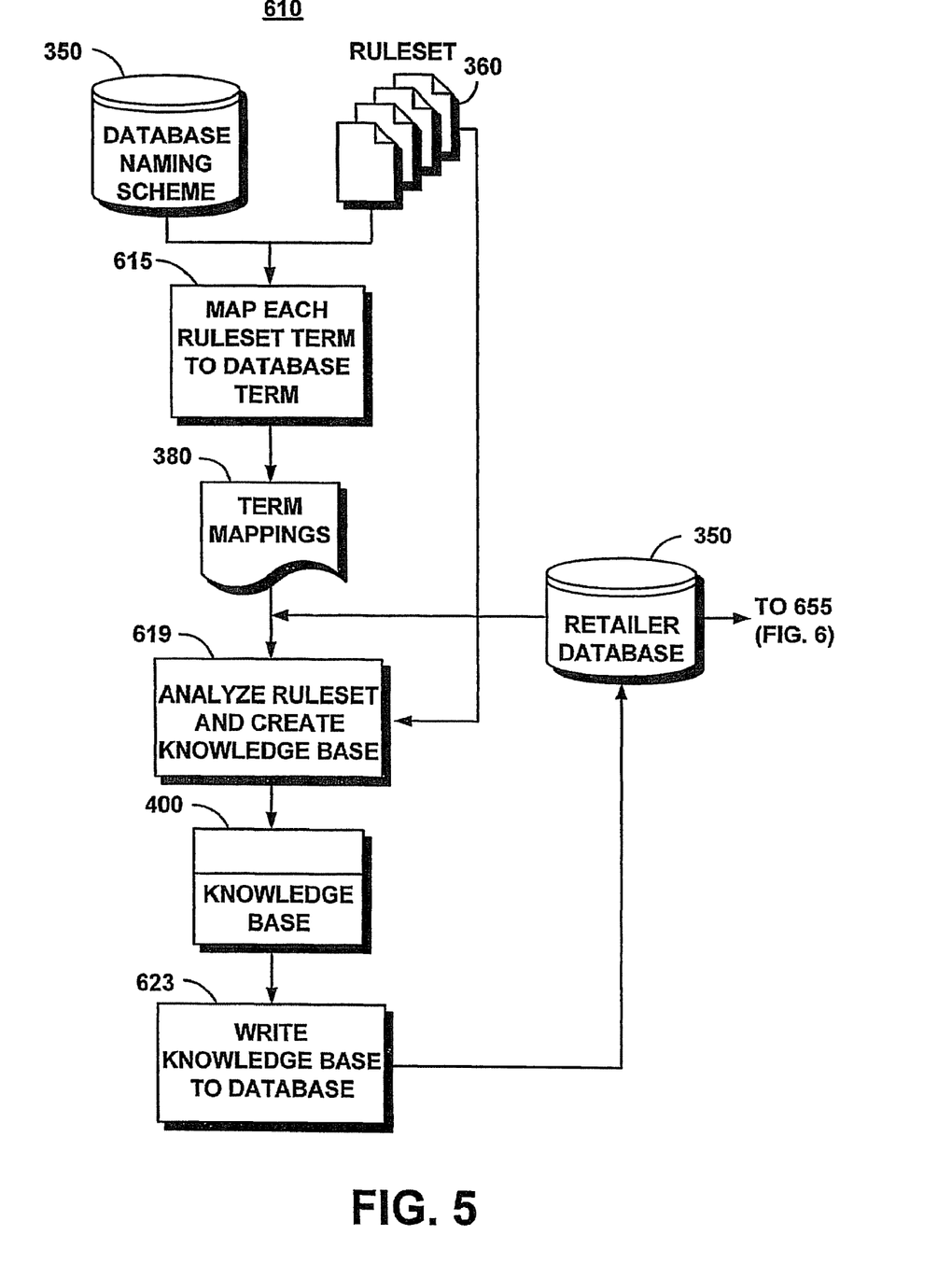
FIG. 5 is a flow chart illustrating the creation of the shopping advisor knowledge base of FIG. 3.

FIGS. 3 and 5 provide a more detailed illustration of an exemplary retail online server 300 that utilizes the system 10 for the creation of a shopping advisor knowledge base 400 from an existing retailer's database 350 and an existing ruleset 360. The retailer database system 350 is a system that is conventionally used by the retailer's web site application to offer online shopping services. For simplicity, it is assumed that the retailer database system 350 is a relational database system. It should however be understood that the present invention can be adapted to work with other types of database systems, e.g. object oriented database systems.

The retailer's relational database system 350 is used during web site operations to provide shoppers with information about offered items and the available inventory. Data types which can consist of numerical identifiers and descriptive labels, may be defined by the following Tables 1-5, for an online clothing store:

TABLE 1

Database table (TYPES) containing item descriptions Type # Type description Categories 0 T-shirt 2, 3 1 Short Sleeve shirt 2, 3 2 Dress 6, 7 . . .

TABLE 2

Database table (CATEGORIES) containing category descriptions Category # Category description 0 Sleepwear 1 Underwear 2 Sportswear . . .

TABLE 3

Database table (COLORS) containing color descriptions Color # Color description 0 White 1 Blue 2 Yellow . . .

TABLE 4

Database table (SIZES) containing size descriptions Size # Size Description 0 S - Small 1 M - Medium 2 L - Large . . .

TABLE 5

Database table (ITEMS) containing items and their availability. Item # Type # Color Size Price ($) Availability 0 0 0 0 30.00 100 0 0 1 0 30.00 56 0 0 0 1 35.00 50 . . .

Tables 1 to 5 are stored in the retailer's database system 350, and represent a simplified database schema. For ease of description, Tables 1 to 5 omit the normalization and efficiency issues. In this example, Table 1 contains data type "TYPES" that includes both a number and a subcategory description. For example, the number 1 and the subcategory "short sleeves shirt", or the number 2 and the subcategory "long sleeve shirts".

Similarly, Table 2 contains data type "CATEGORY" that includes both a number and a category description. For example, the number 1 and category description "sleepwear", or the number 2 and the category "everyday wear". Table 3 contains data type "COLOR" that includes both a number and a color descriptor. For example, the number 1 and the color red, or the number 2 and the color blue. Table 4 contains data type "SIZE" that includes both a number and a size description. For example, the number 1 and the size description "small", or the number 2 and the size description "medium". Table 5 contains data type "PRICE" that includes only a number. For example, the value of the price "35.50", or "99.99". In addition, data type "AVAILABILITY" contains only a number. For example, the number 25 indicates that 25 items are available in stock.

In this simplified retailer's database system 350, the labels include numbers and descriptors, and the schema is meant to be illustrative of a basic setup. It should be clear that more elaborate schemes can be readily developed. In this embodiment, the descriptors are used to demonstrate what kind of information is available in a retailer's database system 350. The entire information in the database 350 is stored using a schema which defines relations, fields and keys.

Software applications, fed by queries from the shoppers' web browsers 140, can access the elements (e.g. fields, keys, values) of the retailer's database system 350, by using SQL (a standard query language). For example: a shopping server application requests that all available items in size L (large) for a price lower than $50.00 be displayed. The shopper's web browser 140 passes information to the shopping server application, which accesses the database 350 by issuing a logical SQL query similar to the following:

"SELECT*FROM ITEMS WHERE PRICE<50.00 AND SIZE=2 AND AVAILABILITY >0"

The database 350 responds with a subset of items, evaluated from the descriptors, which meet the requirements of the SQL query. The shopping server application can then encode this list in HTML and send it to the shopper's web browser 140.

As used herein, a ruleset 360 includes a number of rules that define the related items under certain conditions. For example, rule A of ruleset 360 may be as follows: if the item is a shirt then related items are pants, skirts, etc. As another example, rule B of ruleset 360 may be as follows: if the item has the color red then related items have the colors blue, black or white.

A rule generally includes two parts: the evidence and the conclusion. As an example, in rule B above, if it is assumed that an item has the color red, it is concluded that related items must have the color black, blue or white. Such a rule may be provided in a machine readable (e.g. XML) form to a terminology conversion module 371. It is assumed here that the ruleset 360 is industry dependent but is reusable for retailers of the same industry. Retailer specific extensions of the ruleset 360 are optional and do not affect the underlying invention.

The shopping server proposal system 10 is generally comprised of a terminology conversion module 371 that communicates with the retailer's database system 350 and takes as input the ruleset 360. The terminology conversion module 371 is responsible for providing an analysis and relation 10 is capable of supporting heterogeneous terminologies, that is various naming-schemes, used to access and retrieve information from the database systems 350. As an example, even though two retailers in the same industry use the same database system 350, the tables and values in the database systems 350 can be named differently, but remain nonetheless accessible by the system 10.

An important function of the terminology conversion module 371 is to associate the terminology of the retailer independent ruleset 360 with the schema terminology of the retailer database system 350. The schema of the database system 350 may be retailer specific, depending on the type of database system 350 or the manufacturer of the database application.

The function of the terminology conversion module 371 can be generally described by the following iterative process, and is illustrated by block or step 615 of the method 610 of creating the shopping advisor knowledge base 400 (FIG. 5):

create a list of each term used in the ruleset 360 (list_1);

create an (initially empty) list of term mappings (list_2);

for each term in list_1, perform the following: perform a lookup of the ruleset term; associate the ruleset term with a corresponding term in the schema of the database system 350; and store the new association in list_2; and serialize list_2 into machine readable form.

The step of looking up the ruleset term can be implemented in several ways. According to one implementation, the terminology conversion module 371 can perform the lookup interactively, i.e., the administrator of the database system 350 may select an element (e.g., a field or a value) from the database system 350 for each of the terms of the ruleset 360.

According to another implementation, the retailer provides the mappings externally, as additional input to the terminology conversion module 371. This could be a simple list of term types, such as: item, article; XL, Extra Large.

Another implementation is an automated association using heuristics, such as where a term in the database system 350 has the same meaning as a term in the ruleset 360 with the same name. Though the foregoing implementations have been described separately, it should be clear that these techniques can also be combined. As an example, user interaction may be requested when a term of either the ruleset 360 or the database system 350 cannot be found in the database or the ruleset respectively.

The output of the terminology conversion module 371 can be, for example, in an intermediary format, such as a XML document 380 that describes the mappings of the terms of the database system 350 to the terms of the ruleset 360, as well as database specific information about field names. The following is an exemplary output document 380:

6 <DATABASE_RULESET_MAPPING><MAPPING><DB_TERM><FIELD_TERM value="Item" table="ITEMS"/></DB_TERM><RULESET_TERM value="Article"/></MAPPING><MAPPING><DB_TERM><FIELD_TERM value="Color" table="COLORS"/></DB_TERM><RULESET_TERM value="Color"/></MAPPING><MAPPING><DB_TERM><VALUE_TERM value="red" field ="Color description" table="COLORS"/><RULESET_TERM value="Color"/></MAPPING>... </DATABASE_RULESET_MAPPING> creation module 390 with appropriate input. In turn, the analysis and relation creation module 390 updates a knowledge base 400.

Since retailers may use a variety of database systems 350, and numerous vendors for database applications, the system By providing a generic output document 380, the analysis and relation creation module 390 can be independent of the retailer and the underlying database system 350.

The analysis and relation creation module 390 analyses the ruleset 360 at block 619 of FIG. 5, and creates the shopping advisor knowledge base 400. This shopping advisor knowledge base 400 is represented as a set of relations in the existing database system 350, that is the output of analysis and relation creation module 390 is an extension of the retailer's exiting database system 350.

The input to the analysis and relation creation module 390 includes the output of the terminology conversion module 371 and the ruleset 360. An important objective of the analysis and relation creation module 390 is to discover which items offered by a retailer are related to an item selected by the shopper, based on the ruleset 360 and the data in the database system 350. As used herein, the term "item" refers to a particular piece, such as a shirt, and its distinguishing properties, such as color, size, price, etc.

The process of analyzing the ruleset 360 and creating the shopping advisor knowledge base 400 includes the following steps:

create a mapping list to store references to all the related items of an item;

for each item (referred to as the current item later on) of the retailer database system 350 perform the following steps:

search the terms from the ruleset 360 for terms that are applicable to the current item;

if any of the rules are applicable, combine the applicable rules and create an SQL statement; and if the result set of this statement is not empty, create a list of references to all the related items of the result set, and store a mapping of {current item, list of references} in the mapping list; and create a new database table to hold the mappings for each item and its related items, based on the entries of the mapping list.

As shown in Table 1 above, an item is a record in the database system 350 with a set of attributes, with the attributes being the field names and values. The rules in the ruleset 360 specify conditions that refer to these fields. A rule is applicable to an item if the item satisfies the evidence part of the term from ruleset 360. For example, it is assumed for illustration purposes, that two applicable rules D and E were found for an item X (a red shirt). Rule D may specify that if an item is a shirt (the evidence), all items that are either long trousers or skirts or shorts (the conclusion) are related items. Rule E may specify that if an item has the color red, related items must have the colors black, blue or white. The item X matches both evidences and therefore the two rules D and E are applicable.

Once all the applicable rules (i.e., D and E) are identified, the analysis and relation creation module 390 identifies the items in the retailer's database that can be considered to be related items. As used herein, a "related item" satisfies all the conclusions of each of the applicable rules. In the example above, assume that two applicable rules were found for the current item (i.e., a red shirt). The first rule is: if the item is a shirt then the related items must be long trousers, skirts, or shorts. The second rule is: if the item has the color red then the related items must have the colors blue, black or white. It therefore follows that all items in the database system 350 that are skirts, long trousers, or shorts (conclusion of the first rule), with one of the colors concluded by the second rule, are considered related items.

The related items can be readily determined by combining the conclusions of all applicable rules into an SQL statement of, for example, the following form:

```
SELECT "Item #" FROM Table.ITEMS WHERE Type="long
trousers OR Type="shorts" OR Type="skirt")
    AND(Color="black" OR Color="blue" OR Color="white")
```

The results of this SQL query is a list of item numbers that are references to the related items. This information can easily be stored in a new database table (i.e., the knowledge base 400) as part of, or an extension of the database system 350.

As explained earlier, the output of the analysis and relation creation module 390 is a new database table or the knowledge base 400 that is communicated and written to the existing retailer database system 350. Based on the entries in the mapping list, the new knowledge base 400 can be of conjoined item numbers and related item references, and can assume, for example, the form in the following Table 6:

TABLE 6

Result database table (RELATED_ITEMS) tem # Related Items 0 1, 2, 3 1 4, 5, 6 2 2, 6 . . .

The process of creating the knowledge base 400 is done once, and may only have to be repeated when either the schema of the database system 350 or the ruleset 360 changes. Having described the creation of the knowledge base 400, its use will now be described in connection with FIG. 4.

Figure 4:
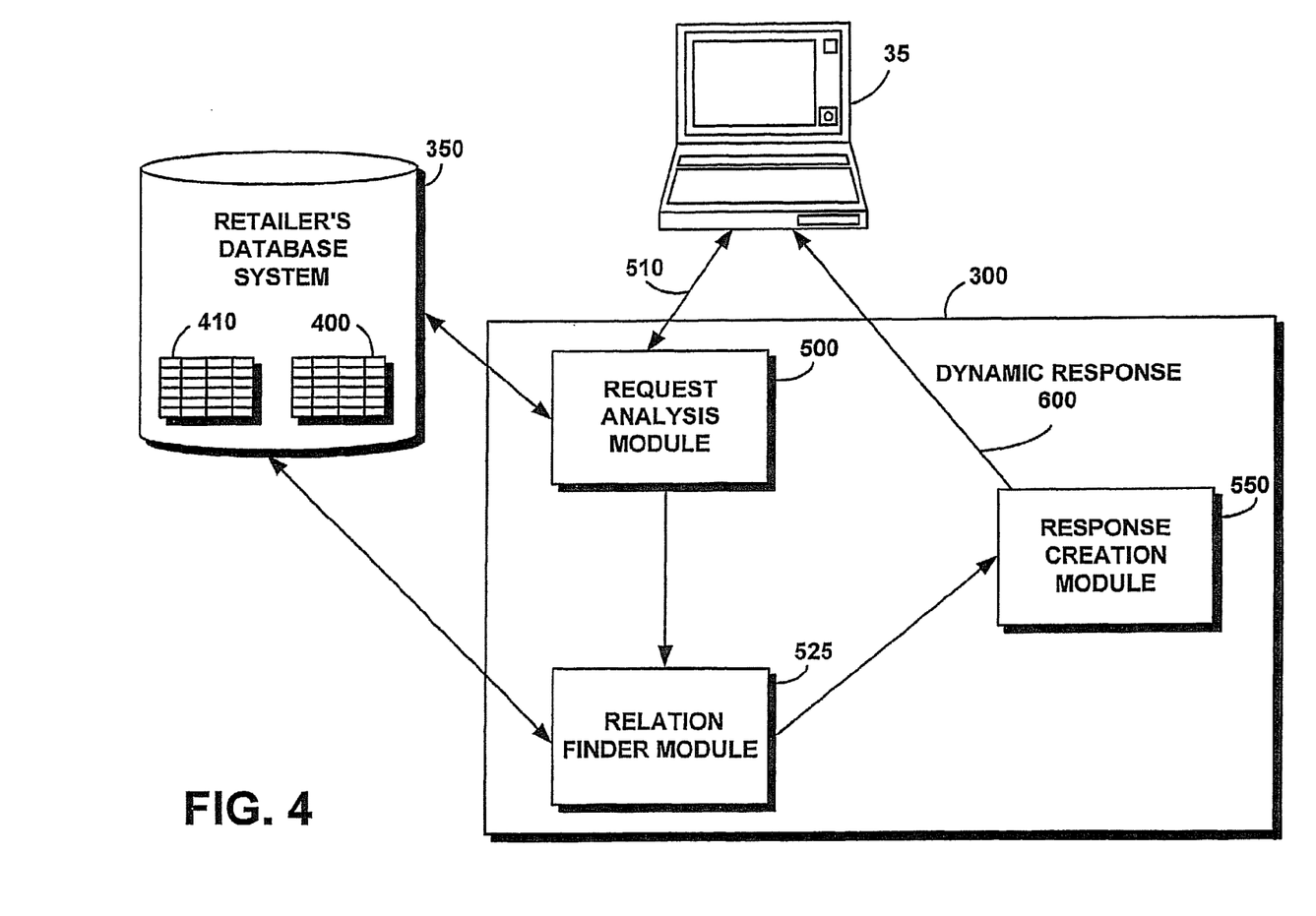
FIG. 4 illustrates an exemplary use of the shopping advisor knowledge base of the retail online server of FIG. 3
Figure 6:
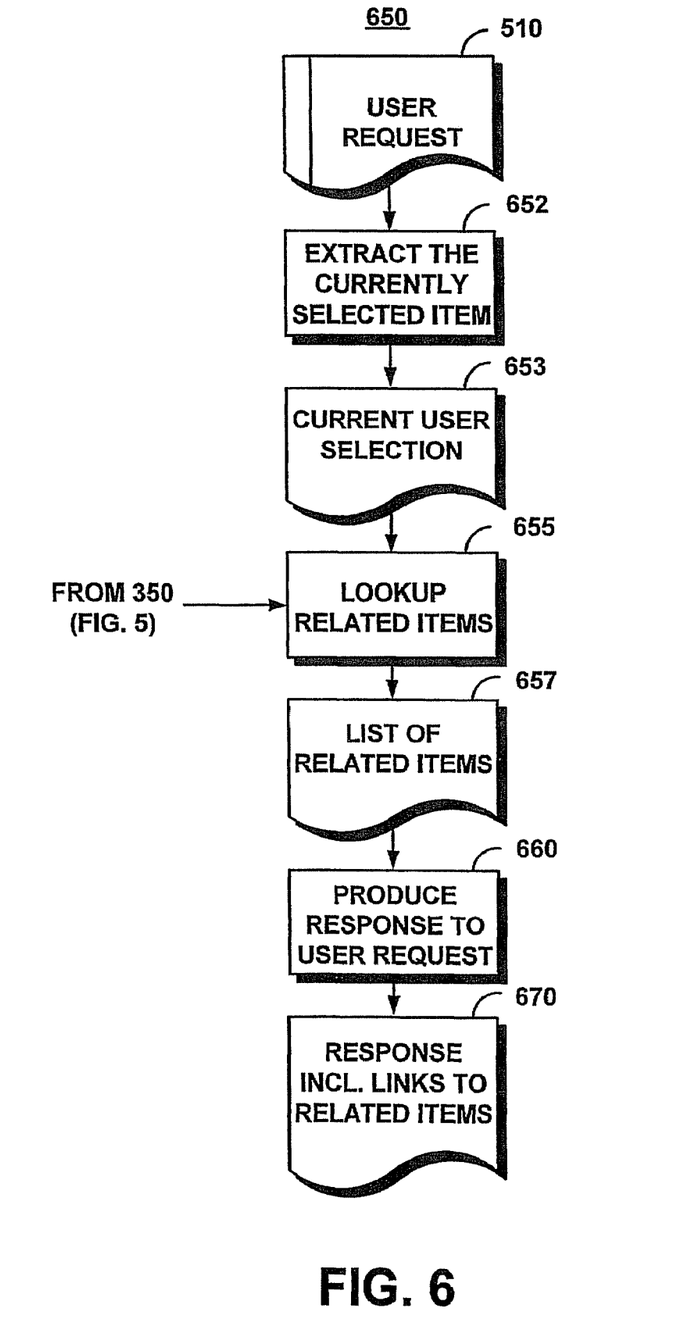
FIG. 6 is a flow chart illustration the use and operation of the shopping server proposal system of the foregoing figures including the shopping advisor knowledge base of FIG. 5.

FIGS. 4 and 6 illustrate an exemplary usage, or a method of use 650, of the knowledge base 400. A shopper 35 browses an online retailer shopping site 300 and selects an item to look at or to buy at block 510. Instead of having the shopping site 300 simply return a web page containing information about the selected item, the shopping server 300 can now include information about related items.

To this end, the shopping server 300 is provided with three modules: A request analysis module 500, a relation finder module 525, and a response creation module 550. The request analysis module 500 receives incoming requests 510 from the shoppers 35 and identifies the currently selected item or items. This information is extracted from the request (step 652), which is typically an HTTP GET or POST request. The request 510 contains all the necessary pieces of information, i.e., item number, attributes, etc., which uniquely identify the user's current selection. The request analysis module 500 extracts that information, at block 652, and delivers this information 653 to the relation finder module 525. It should be noted here that, depending on the underlying implementation, the request may not contain all information about selected item but just a simple reference. In such a case, the above mentioned process of extracting the information about the selected item 652 may access the database. For the purpose of clarity we omitted this in FIG. 6.

The relation finder module 525 issues an SQL statement, based on the input from the request analysis module 500. The result of this SQL statement is the set of the related items 657 from the database system 350 (FIG. 5). This result set includes references to the related items 657 and to all the attributes of the related items 657, and is delivered to the response creation module 550.

The response creation module 550 receives the result set of related items and attributes and the originally selected items, and creates, at block 660 (FIG. 6), a dynamic response 600 to the shopper's request 510. This response can be, for example, an HTML page that is rendered and displayed by the shopper 35 using the web browser or user interface 140 (FIG. 3). This dynamically created HTML page focuses on the originally selected item but also offers advice to the user about the related items. There are several ways to provide this advice. One possibility is to provide a highly visible button for the user to press to review related items. Another possibility is the use of additional windows and frames. Other possibilities include animation, audio, and/or video attachments. However this implementation depends on the retailer's preferences and the available technology on the shopper's side.

It is to be understood that the specific embodiments of the invention that have been described are merely illustrative of certain application of the principle of the present invention. Numerous modifications may be made to the shopping server proposal system 10 and associated method described herein without departing from the spirit and scope of the present invention. For example, the system 10 can provide advice in the form of a recommendation.

As used herein, the term advice is based on the fact that all associations between items are created based on the ruleset. The ruleset is defined by one or more experts in a certain fields such as fashion or electronics, and will lead to associations that are reasonable and appropriate in terms of the respective field. As a result every related item can be understood as an advice or a recommendation to combine the currently selected item with any one or more of the related items.

With regards to the personalization aspect, if a user's profile is known, the user's preferences in terms of colors sizes and prices could be combined with the present invention but is not precomputed with the ruleset.

What is claimed is:

1. A shopping server proposal system that enhances a merchant's existing database system, comprising:
    a terminology conversion module, implemented by the shopping server in response to instructions stored on a computer readable medium, that communicates with the existing database system, and having as input a ruleset, for outputting a terms mapping document that maps terms of the database system to terms of the ruleset, the terminology conversion module associating terminology of a retailer independent ruleset with schema terminology of a retailer database system by mapping terms from the retailer independent ruleset to terms in the retailer database system and serializing the mapping document into machine readable form;
    an analysis and relation creation module, implemented by the shopping server in response to instructions stored on a computer readable medium, connected to the terminology conversion module for receiving the terms mapping document and for analyzing a catalog of items in the existing database system based on the terms mapping document, to determine which of the items in the catalog are related to other items in the catalog, and to define a new set of relations between the catalog items, the analysis and relation creation module further applying the new set of relations to the existing database system to update the database system by providing the new associations of the items in the database system;
    wherein each rule in the ruleset comprises an evidence and a conclusion that leads to new associations between the catalog items, and that correlates the items under certain conditions;
    a shopping advisor knowledge database that comprises the new associations for each item of the existing database system; and
    a shopping server that offers an automated, dynamic, and personalized shopping advice to the shopper based on a shopper query, by retrieving the new associations in the shopping advisor knowledge database, and items from the database system that have been related by the new associations.

2. The system according to claim 1, wherein the shopping server includes a request analysis module, a relation finder module, and a response creation module.

3. The system according to claim 2, wherein the request analysis module receives an incoming request and identifies currently selected items based on the request.

4. The system according to claim 3, wherein the relation finder module retrieves all related items by issuing a query statement, based on the currently selected items identified by the request analysis module.

5. The system according to claim 4, wherein the relation finder module retrieves a result set of related items from the database system that includes references to the related items and to all attributes of the related items.

6. The system according to claim 5, wherein the relation finder module delivers the result set to the response creation module.

7. The system according to claim 6, wherein the response creation module creates a dynamic response to the incoming request based on the result set of related items.

8. The system according to claim 7, wherein the dynamic response is rendered in a browsable form.

9. A computer program product having instructions executable by a server stored on a computer readable medium for enhancing a merchant's existing database system, comprising:
    a terminology conversion module that communicates with the existing database system, and having as input a ruleset, for outputting a terms mapping document that maps terms of the database system to terms of the ruleset, the terminology conversion module associating terminology of a retailer independent ruleset with schema terminology of a retailer database system by mapping terms from the retailer independent ruleset to terms in the retailer database system and serializing the mapping document into machine readable form;
    an analysis and relation creation module connected to the terminology conversion module for receiving the terms mapping document and for analyzing a catalog of items in the existing database system based on the terms mapping document, to determine which of the items in the catalog are related to other items in the catalog, and to define a new set of relations between the catalog items, the analysis and relation creation module further applying the new set of relations to the existing database system to update the database system by providing the new associations of the items in the database system; and
    wherein each rule in the ruleset comprises an evidence and a conclusion that leads to new associations between the catalog items, and that correlates the items under certain conditions;
    a shopping advisor knowledge database that comprises the new associations for each item of the existing database system; and
    a shopping server that offers an automated, dynamic, and personalized shopping advice to the shopper based on a shopper query, by retrieving the new associations in the shopping advisor knowledge database, and items from the database system that have been related by the new associations.

10. The computer program product according to claim 9, wherein the shopping server includes a request analysis module, a relation finder module, and a response creation module.

11. The computer program product according to claim 10, wherein the request analysis module receives an incoming request and identifies currently selected items based on the request; and wherein the relation finder module retrieves all related items by issuing a query statement based on the currently selected items identified by the request analysis module.

12. The computer program product according to claim 11, wherein the relation finder module retrieves a result set of related items from the database system that includes references to the related items and to all attributes of the related items; wherein the relation finder module delivers the result set to the response creation module; wherein the response creation module creates a dynamic response to the incoming request based on the result set of related items; and wherein the dynamic response is rendered in a browsable form.

* * * * *